US009605611B2

(12) United States Patent
Shah et al.

(10) Patent No.: US 9,605,611 B2
(45) Date of Patent: Mar. 28, 2017

(54) METHOD FOR ANALYZING INJECTOR PERFORMANCE

(71) Applicant: International Engine Intellectual Property Company, LLC, Lisle, IL (US)

(72) Inventors: Nirav Atul Shah, Forest Park, IL (US); Mark Brian Michelotti, Barrington, IL (US); Sumeet Suresh Yerunkar, Lombard, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 282 days.

(21) Appl. No.: 14/089,140

(22) Filed: Nov. 25, 2013

(65) Prior Publication Data

US 2015/0149063 A1   May 28, 2015

(51) Int. Cl.
   *F02D 41/00*  (2006.01)
   *F02D 41/14*  (2006.01)
   *F02D 41/24*  (2006.01)
   *F02D 41/40*  (2006.01)

(52) U.S. Cl.
   CPC ..... *F02D 41/0085* (2013.01); *F02D 41/0097* (2013.01); *F02D 41/1498* (2013.01); *F02D 41/2467* (2013.01); *F02D 41/40* (2013.01); *F02D 2200/101* (2013.01); *F02D 2200/1012* (2013.01); *Y02T 10/44* (2013.01)

(58) Field of Classification Search
   CPC ....... Y02T 10/44; Y02T 10/40; Y02T 10/123; F02D 41/2467; F02D 41/402; F02D 2200/101; F02D 2200/1012; F02D 41/221; F02D 41/1497
   See application file for complete search history.

(56) References Cited

U.S. PATENT DOCUMENTS

| | | | | |
|---|---|---|---|---|
| 4,590,907 A | * | 5/1986 | Tsukamoto | F02D 41/0085 123/357 |
| 4,862,853 A | * | 9/1989 | Tsukamoto | F02D 41/345 123/357 |
| 6,021,758 A | * | 2/2000 | Carey | F02D 41/0085 123/406.24 |
| 6,546,912 B2 | * | 4/2003 | Tuken | F02D 41/0085 123/436 |
| 6,988,029 B1 | | 1/2006 | Kennedy | |
| 7,200,485 B2 | * | 4/2007 | Kennedy | F02D 41/10 123/446 |
| 8,036,811 B2 | * | 10/2011 | De Fazio | F02D 41/1497 701/103 |

(Continued)

*Primary Examiner* — Sizo Vilakazi
(74) *Attorney, Agent, or Firm* — Jack D. Nimz; Jeffrey P. Calfa (57) ABSTRACT

Injector drift for a diesel engine are detected by reconfiguration of injection patterns from one pattern into a pattern with a different number of pulse points while attempting to hold total fuel injected constant. If a particular injector is subject to drift then changes in the pulse pattern result in an increase or decrease in fuel injected and consequential variations in engine speed. By applying alternating injection patterns at constant fuel demand and allowing engine speed time to stabilize, a rhythmic variation in engine speed/torque will appear which can be detected using one of a number of techniques.

7 Claims, 5 Drawing Sheets

(56) References Cited

U.S. PATENT DOCUMENTS

2007/0240675 A1\* 10/2007 Ban .................. F02D 41/20
  123/299
2013/0096805 A1\* 4/2013 Hoshi ............... F02D 41/0085
  701/104

\* cited by examiner

Engine speed oscillation with $Q_{2n} = Q_{2n+1}$

FIG. 5

Engine speed oscillation with $Q_{2n} > Q_{2n+1}$

FIG. 6

Engine speed oscillation with $Q_{2n} < Q_{2n+1}$

Time-domain engine speed signal with the pattern change active and injector #1 flowing high

FIG. 10

Frequency-domain engine speed signal with the pattern change active and injector #1 flowing high

FIG. 11

METHOD FOR ANALYZING INJECTOR PERFORMANCE

BACKGROUND

Technical Field

The technical field relates to fuel injection for internal combustion (IC) engines, and more particularly to detecting fuel injector quantity drift on diesel-cycle IC engines.

Background to the Technical Field

Diesel engines have historically used various forms of fuel injection. Contemporary diesel engine fuel injection systems are usually "common rail" systems. In a common rail fuel injection system a high-pressure pump stores fuel in a reservoir or accumulator at high pressure. The term "common rail" is a reference to the fact that all of the fuel injectors for the engine are supplied from this single high pressure accumulator. The fuel injectors are usually controlled by a programmable micro-controller based device referred to as an engine control unit (ECU). With the fuel injectors electrically activated by the ECU, fuel is sprayed into the cylinders at the desired pressure. Since the fuel pressure energy is stored remotely and the injectors are electrically actuated, the injection pressure at the start and end of injection should remain very near the pressure in the accumulator (rail) and produce an injection pulse with close to a square wave form. If the accumulator and injectors are functioning properly, injection pressure and rate will be the same for each of the multiple injection events during a combustion stroke for a cylinder and duration of the pulse will conform to target values. Under these conditions the quantity of fuel delivered highly controllable.

Common rail fuel injection systems have made it easier to control diesel engine exhaust emissions and noise through modification of combustion stroke fuel injection patterns. While the quantity of fuel to be injected per power stroke is fixed by an externally sourced demand for power, such as the position of a vehicle accelerator pedal, delivery of the fuel is distributed over multiple injection pulses. A minimum multiple injection pulse pattern includes two injection pulses. These are referred to as a pilot injection pulse and a main injection pulse. A pilot injection pulse precedes top dead center (TDC) of piston travel at the end of the compression stroke by a few degrees while a main injection pulse occurs close to TDC. Dispersing fuel among multiple points spreads out the burn and mitigates the characteristic of diesel engines of combusting most of the injected fuel almost immediately upon initial ignition. This reduces the noise and can be tailored to reduce emissions.

The quantity of fuel actually injected by an injector during an injection pulse is subject to drift away from nominal values over the service life of an engine. When the fuel to be injected for a given power stroke is divided among more than one injection pulse, the effects of injector drift for that cylinder tend to be scaled by the number of pulses used in the injection pattern. This can have a number of consequences including an increase in engine emissions.

Diesel engine on board diagnostic (OBD) systems has provided monitoring of fuel system performance to detect malfunctions in individual injector fuel delivery. One way this has been done is by comparing changes in crankshaft speeds for each cylinder's power stroke. A significant speed difference from the average may indicate a correlated injector's fuel delivery was off nominal Another form of monitoring is an intrusive test that attempts to inject a small quantity of fuel and view the subsequent crankshaft acceleration. If the acceleration was outside an expected range a fault in an injector could be indicated. Any diagnostic routine should take into account that injector drift may differ from injector to injector on the same engine.

SUMMARY

The method of injector drift detection is based on two assumptions. First, injector drift for a particular injector, either as over-fueling or under-fueling, occurs equally for all injection pulses in a multiple injection pattern. Second, there is a fixed relationship in the amount of fuel injected to torque generated during the combustion/power stroke. This approximation holds true as long as the fuel is injected early enough in, or just before the beginning of, the power stroke and sufficient oxygen is present to support combustion of the fuel.

Absent injector drift, engine torque and engine speed should be unaffected by reconfiguration of a multiple injection pattern into another pattern, such as a single pulse, because the total fuel injected per cycle remains constant. If an injector is subject to drift changing the number of injection pulses for the injector affects the quantity of fuel injected. The increase or shortfall in fuel injected will manifest itself as variations in engine torque and speed proportional to the changes in the number of injection pulses. By applying alternating injection patterns with differing numbers of injection pulses to a cylinder, a drifting injector will manifest itself in a periodic change in engine speed/crankshaft angular velocity due to changes in fuel combusted. If the engine is a four-stroke engine the variation will be at ¼ the order of the crankshaft frequency (or more precisely crankshaft angular position). This order can be detected on one of several ways including a fast Fourier Transform (FFT) and other techniques. The order will be ½ of crankshaft frequency for a two stroke engine if normal and reconfigured patterns are applied to alternating power strokes. The order can be chosen for either two or four stroke engines by choosing different schedules for the two patterns. For example, changing the injection pulse pattern only once every third or fourth injection event/power stroke. It may be possible to detect the signal based on changing the injection pattern only once although there is no frequency component generated.

DETAILED DESCRIPTION

In the following detailed description, like reference numerals and characters may be used to designate identical, corresponding, or similar components in differing drawing figures. Furthermore, example sizes/models/values/ranges may be given with respect to specific embodiments but are not to be considered generally limiting.

Figure 1:
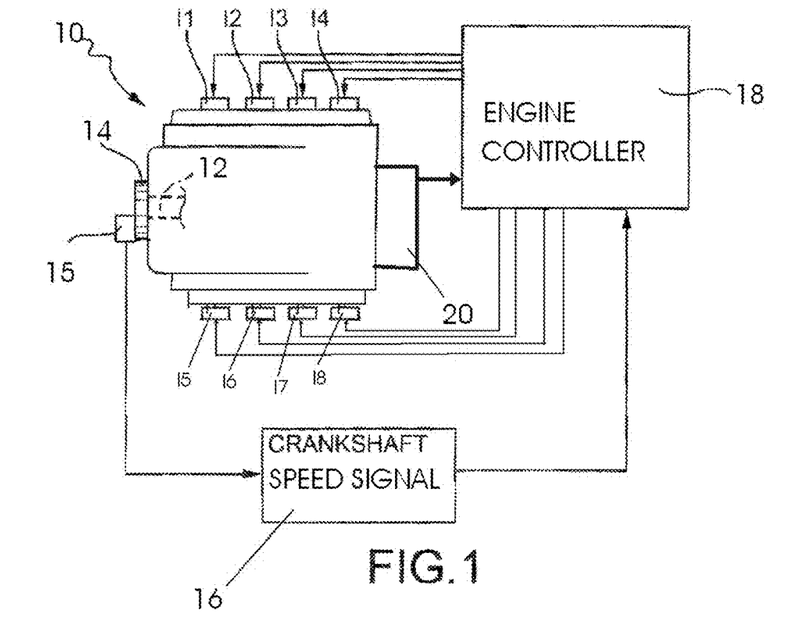
FIG. 1 is a simplified block diagram of an engine system.

Referring to FIG. 1, a four-stroke, diesel-cycle IC engine 10 having eight cylinders (not shown) is illustrated. IC engine 10 has a common-rail fuel injection system with eight injectors I1 through I8. Pistons (not shown) disposed within the cylinders are connected to a crankshaft 12 which is connected to an output gear 14. A crankshaft position sensor 15 generates a signal indicating the position (segment) of output gear 14 from which a crankshaft speed may be generated by a crankshaft speed generator. Engine speed, crankshaft position θ, and a variety of engine sensors 20 signals are available to an engine controller 18 which controls injectors I1-I8 and which may be programmed to analyze injector I1-I8 operation.

In a reciprocating IC engine the gas-pressure cycle in each cylinder is a periodic function correlated with crankshaft 12 position. In a four-stroke engine a full cycle has a period of 720° rotation of the crankshaft 12. The encompasses a downward piston power stroke beginning at 0 or top dead center for a given piston, an upward exhaust stroke beginning at 180°, an intake stroke beginning at 360°, and a compression stroke beginning at 540°. Power strokes thus occur with crankshaft frequency of ½. If the injector is mis-metering fuel the crankshaft 14 should then exhibit a pattern of speed changes corresponding with power strokes for the cylinder which has the drifting injector, that is ½. Unless context otherwise make clear, the term "frequency" as used here refers to the angular position domain of the crankshaft. At engine idle, or other point of steady state engine operation, crankshaft frequency is closely correlated to frequency in the time domain.

The injector evaluation routine described here applies two fuel injection patterns to an injector, alternating the patterns with each power stroke. Each pattern occurs once every 4 rotations of the crankshaft. The patterns differ in the number of injection pulses but have the same target quantity of fuel to inject. If there is injector drift however the actual quantity of fuel delivered changes with each power stroke for the cylinder undergoing evaluation. The speed of the crankshaft 14 will then be subject to oscillations with one period period of oscillation having a crankshaft frequency of ¼.

Figure 2:
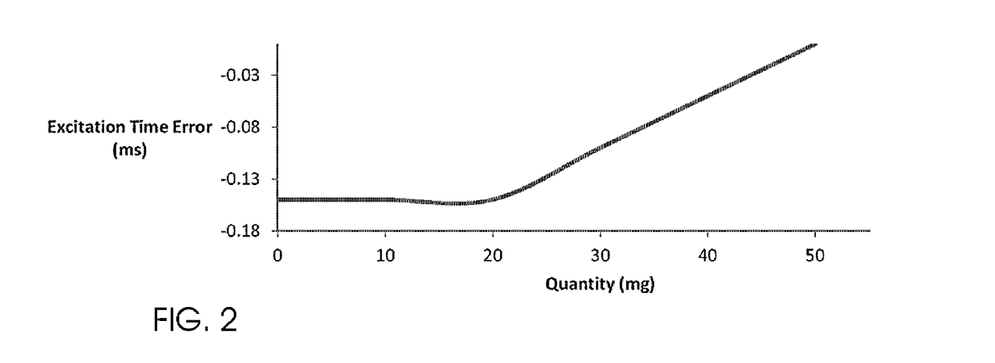
FIG. 2 is a graphical illustration of a fuel system injector error.

Injection error can occur in several ways. One of these is injection time drift. FIG. 2 illustrates an under-fueling error relationship against excitation time error at a given common rail pressure. An over-fueling error would be a mirror image of FIG. 2 across the x-axis. Other forms of injector drift include drifts in rail-pressure sensors, drifts of injector back-flow pressure, etc.

Figure 3:
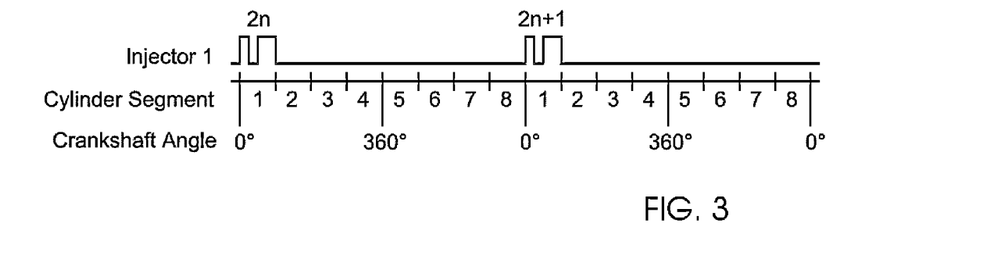
FIG. 3 is a graphical illustration of a fuel injection sequence for a cylinder utilizing a single injection pattern.

Referring to FIG. 3, a normal fuel injection operating pattern is illustrated for "cylinder 1" on an eight cylinder, four-stroke diesel engine which is operating normally. With no significant injector drift, cylinders of the engine balanced and the idle governor operating nominally, engine speed comprises a relatively predictable set of frequency-domain components when operated at a steady level such as in a steady state idle. An injection pattern comprising a pilot injection pulse point which begins preceding crank shaft angle of 0° and a main injection pulse trailing the pilot injection pulse are shown for cylinder 1. Top dead center for cylinder 1 is arbitrarily set to correspond to a crank shaft angle of 0°. The pattern repeats after every second complete revolution of the crankshaft during the power stroke for cylinder 1.

Figure 4:
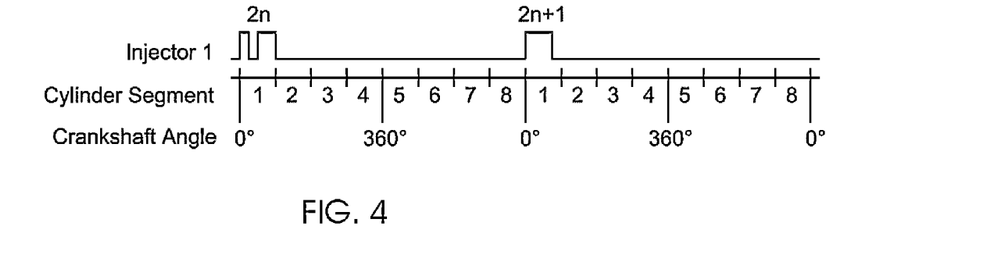
FIG. 4 is a graphical illustration of a fuel injection sequence for a cylinder utilizing alternating injection patterns.
Figure 5:
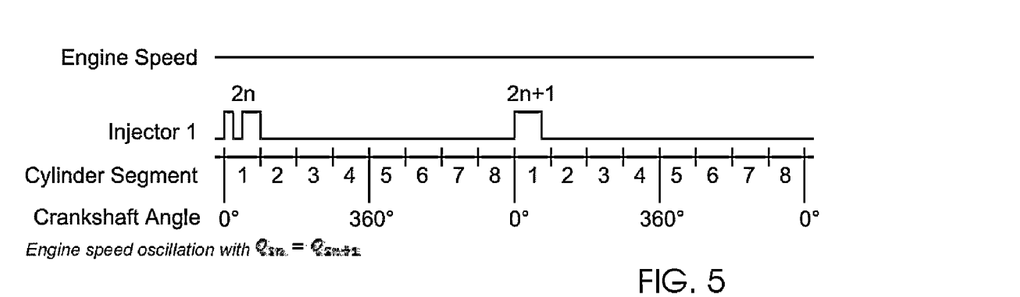
FIG. 5 illustrates engine speed response for an engine undergoing injector testing where the fuel injection sequence for a cylinder whose injector is not subject to drift is being operating using alternating injection patterns.

FIG. 4 shows alternation between the normal operating injection pattern which uses two pulse points of fuel and a pattern which is intended to inject all of the fuel for the power stroke as a single pulse for cylinder 1. If the injector is operating nominally this should result in no change in engine speed and little change in the frequency-domain (or more strictly speaking the crankshaft angle position) spectrum of engine speed as the quantity of fuel remains balanced and unchanged for each power stroke (See FIG. 5). The remaining cylinders remain active and are operated normally. It will be clear to those skilled in the art that the alternation in patterns can be carried out in a number of ways and can be generalized as n injections and m injections, with n!=m.

Assume that the injector I1 for cylinder 1 has drifted from nominal operation. Given that the same error occurs with each injection pulse modification of the pulse pattern to a single pulse during testing reduces the error in delivered fuel quantity Q by half strengthening a frequency component of ¼. Where the injector is over-fueling the over-fueling occurs on both the $2n^{th}$ power stroke and the $2n+1^{th}$ power stroke, but not equally. It is this difference in fueling that drives a new oscillation in engine speed. This adds a new oscillation frequency into the angular speed signal from the crankshaft. The same phenomenon occurs with respect to under-fueling except that speed changes in the engine have the opposite polarity.

Even though crankshaft speed variations produced by a drifting injector can occur at ½ the crankshaft frequency without changes to the pulse pattern, there are problems in practice in basing detection of drifting just on this basis. First, it is a relative measure and it is hard to isolate which injector is over or under-fueling. Second, adaptive cylinder balancing (ACB) implemented by the engine controller 18 affects the ½ order frequency magnitude somewhat unpredictably.

ACB is used to even out the contribution of each cylinder in an engine to overall power output when an engine is at or close to idle operation. A pulse width adjustment (PWA) for each cylinder is used to modify the fuel injection pulse width to stabilize engine idle operation. If cylinder 1 is over-fueling, cylinder balance will remove fuel accordingly until engine speed stabilizes. It does this in a closed-loop manner which results in unpredictable frequency-domain behavior—i.e., sometimes the ½ order frequency component is very low in magnitude, and sometimes it is very high, even on the same vehicle and the same drive cycle. While there are many frequencies present in the crankshaft speed signal the dominant frequencies are usually ½ order—the frequency of the diesel cycle. This resonates at first order, 3/2 order, etc. and continuing up the spectrum.

The present test algorithm injects an additional frequency at ¼ order into the spectrum of crankshaft speed, which is not excited to a significant level during normal engine operation. Because so many other frequencies are present, the ¼ order component is isolated using a fast Fourier Transform or some other method before measured.

Figure 6:
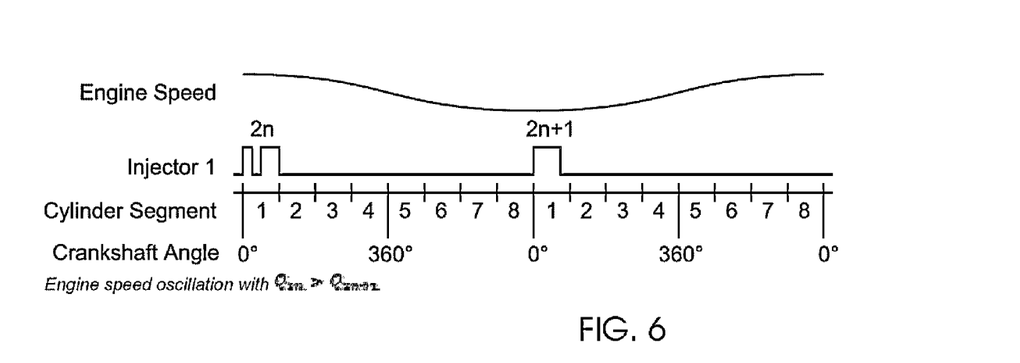
FIG. 6 illustrates engine speed response for an engine undergoing injector testing where the fuel injection sequence for a cylinder whose injector is subject to over-fueling drift is being operating using alternating injection patterns.
Figure 7:
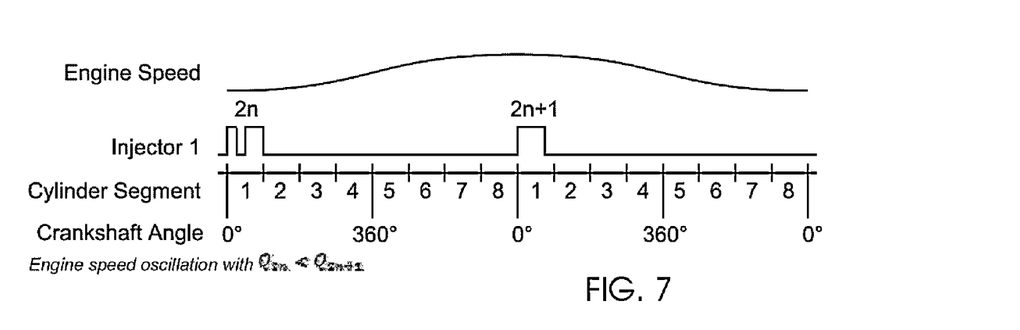
FIG. 7 illustrates engine speed response for an engine undergoing injector testing where the fuel injection sequence for a cylinder whose injector is subject to under-fueling drift is being operating using alternating injection patterns.

FIGS. 6 and 7 are graphic examples of the effect of changing the injection pattern in an alternating fashion for cylinder 1 where the injector I1 is over-fueling and under-fueling respectively. In FIG. 6 the net over-fueling amount is reduced by consolidating the pulses ($Q_{2n} > Q_{2n+1}$) and a dip in crankshaft speed results. In FIG. 7 the net under-fueling amount is reduced ($Q_{2n} < Q_{2n+1}$) and an acceleration in crankshaft speed results for an engine with active ACB.

Figure 8:
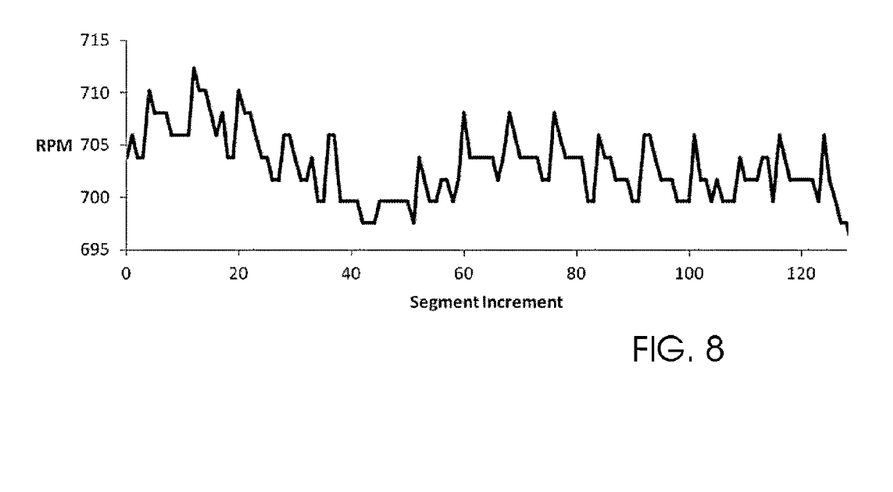
FIG. 8 illustrates engine speed response for an engine undergoing injector testing where the fuel injection sequence for a cylinder whose injector is not subject to drift is being operating using alternating injection patterns.

FIG. 8 illustrates the influence on engine speed of application of the alternating injection pulse pattern on an engine in which injector operation is within nominal allowances. The "time" axis is not, strictly speaking, in the time domain but is instead measured in crank segments or the "crankshaft angular position domain." This reflects the crankshaft-synchronous character of the system. Use of a "crankshaft angular position domain" rather than true frequency also helps focus the spectrum that is generated. Unlike the idealized examples of FIGS. 6 and 7 the effects of the ¼ order oscillation are not immediately apparent when considered in the time domain.

Figure 9:
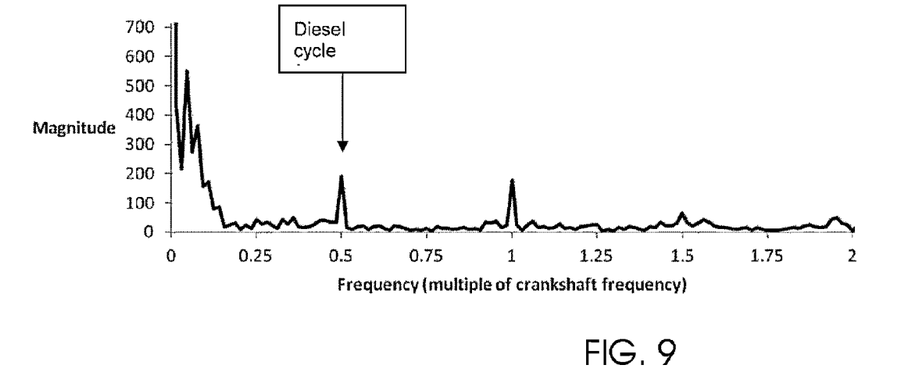
FIG. 9 is a Fourier Transform on the signal of FIG. 8.

FIG. 9 is analogous to a frequency-domain representation of the crankshaft speed signal. The magnitude of the ¼ order "frequency" is almost undetectable. The two different injection patterns are producing nearly equal torque. The ½ order frequency peak corresponds to the frequency of the diesel-cycle which takes two revolutions to complete.

Figure 10:
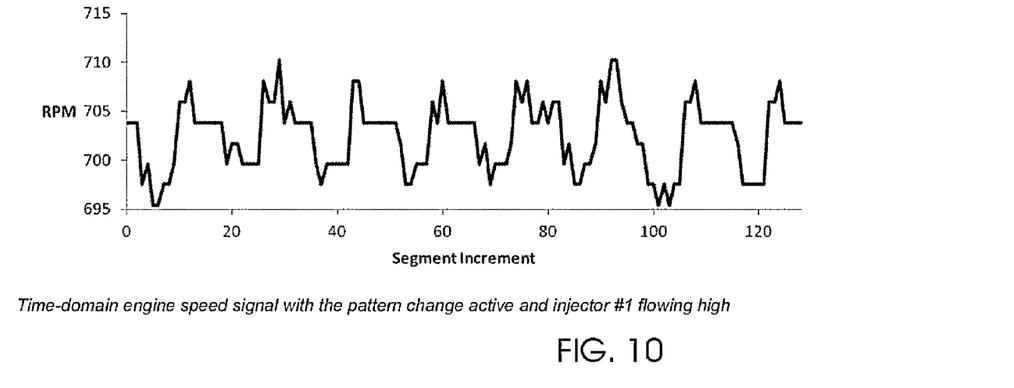
FIG. 10 illustrates engine speed response for an engine undergoing injector testing where the fuel injection sequence for a cylinder whose injector is subject to drift is being operating using alternating injection patterns.
Figure 11:
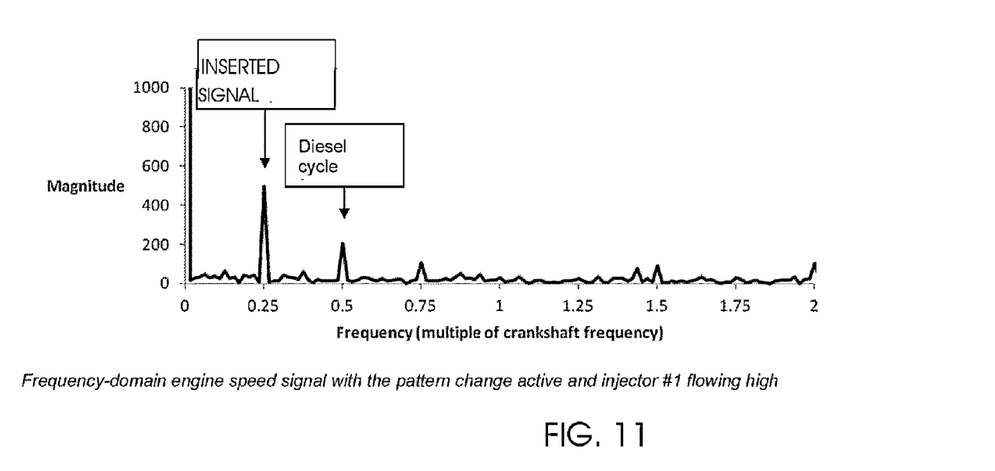
FIG. 11 is a Fourier Transform on the signal of FIG. 10.

FIGS. 10 and 11 reflect application of the same test procedure as in FIGS. 8 and 9, except that injector I1 is subject to drift and is now over-fueling. In FIG. 10 a noticeable period of 16 "crankshaft segments" appears in the crankshaft angular position domain. This corresponds to the expected ¼ order frequency appearing in the equivalent "frequency-domain" plot of FIG. 11 developed by application of a fast Fourier Transform.

Figure 12:
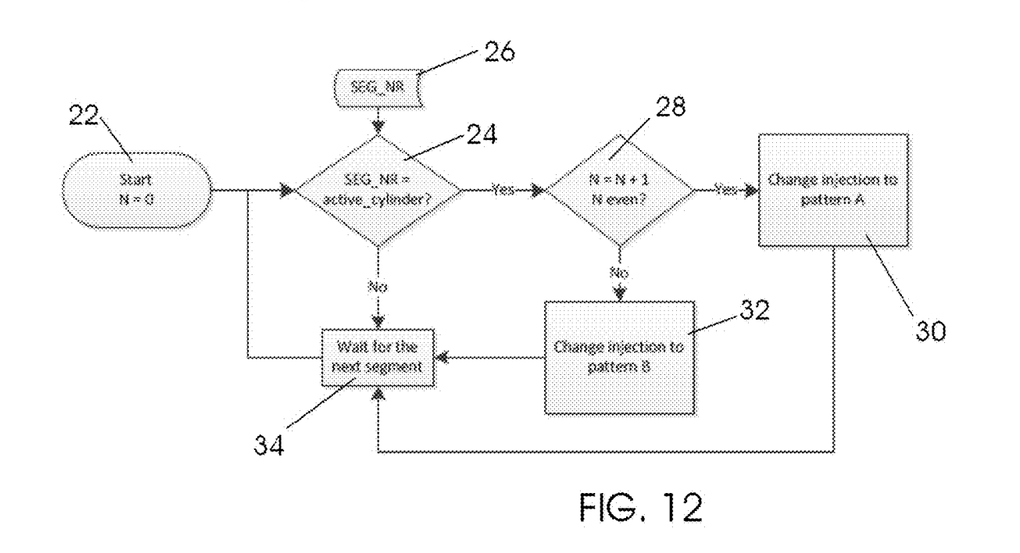
FIG. 12 is a flow chart.

Injector performance for each of injectors I1 through I8 is evaluated during engine idle operation with all cylinders active. The same pattern change is applied to one cylinder at a time, each time alternating between the normal pattern (which continues to be applied to the other injectors) and a modified pattern selected to introduce a ¼ order frequency disturbance to crankshaft speed. A flow chart illustrating the process is illustrated in FIG. 12. After initiation of the counter N at 0 at step 22 the process advances to step 24 where the crankshaft position signal reports the current segment number 26 for the crankshaft. If the segment number (SEG_NR) of the output gear 14 corresponds to the active cylinder, that is the cylinder undergoing testing, the operation advances along the YES branch to step 28. If SEG_NR does not correspond to the active segment a wait step is executed at step 34 and the process re-executes step 24.

At step 28 the counter N is incremented and it is determined if the result is even. If N is odd then the injection pulse pattern for the current injector is changed to the test patter "B" at step 32. If N is even the pattern is left at its normal "A" pattern via step 30. After either step 30 or 32 processing moves to step 34 to await incrementation of the segment number. By applying alternating injection patterns at constant fuel demand and allowing engine speed time to stabilize around an average, a rhythmic variation in engine speed/torque appears.

As discussed above a well defined method of detection for frequency components in a signal is the Fourier Transform. Here a 256 element length FFT of the instantaneous engine speed signal is computed. The result is a complex array containing the discrete frequency representation of the signal. The $16^{th}$ element in the array corresponds to the ¼ order frequency component. Other mathematical approaches may be taken such as using a band pass filter centered on the ¼ order.

Conflation of the injection pulses into a single pulse can result in the engine producing audible noise during testing. This can be mitigated by using a "B" or test pattern which increases the number of injection pulses rather than consolidating them. There may be practical considerations limiting further division of a pattern into three or more injection pulses where over-fueling drift is so great that the pulses began to overlap. If such an approach is used crankshaft angular velocity speed changes would increase during testing where there is over-fueling drift and decrease where there is under-fueling drift, the opposite of occurs when fuel pulses are consolidated.

Another possible modification is to coordinate application of the test injection pattern to several injectors. Under this scheme during a given instance of two rotations of the crankshaft the test pattern may be alternated on two or more injectors. This could make the system more sensitive to injector drift if it is affecting more than one injector.

What is claimed is:

1. A method for detecting injector drift on an internal combustion engine, the method comprising the steps of:
    establishing at least first and second patterns of fuel injection pulses for application to a cylinder of the internal combustion engine with the first and second patterns differing in number of fuel injection pulses while having the same nominal target amount of fuel to deliver;
    operating the engine at a target level steady state condition with the injectors for all cylinders being active;
    selecting a first cylinder to test;
    injecting fuel to the selected cylinder using each of the first and second patterns at least once during a period;
    determining if engine speed varies with correlation to the first and second patterns of fuel injection pulses injected into the first cylinder;
    terminating variation of fuel injection into the first cylinder with both first and second patterns of fuel injection pulses;
    selecting a second cylinder to test;
    injecting fuel into the second cylinder using each of the first and second patterns at least once during a period;
    determining if engine speed varies with correlation to the first and second patterns of fuel injection pulses injected into the second cylinder.

2. The method of claim 1, wherein the internal combustion engine is a four cycle diesel engine, the step of injecting fuel involving alternating between the first and second patterns and engine speed varies with a one quarter order of engine crankshaft angular position.

3. The method of claim 2, the step of injecting fuel continuing until the frequency components of engine speed have stabilized.

4. The method of claim 1 where the first pattern comprises a plurality of injection pulses and the second pattern comprises a single injection pulse.

5. A method of evaluating internal combustion engine fuel injector operation, the method comprising the steps of:
- operating the internal combustion engine at idle;
- selecting at least a first injector for evaluation;
- changing the number of injection pulses from the injector or injectors under evaluation on a periodic basis over a period of time without changing the target amount of fuel to inject;
- monitoring engine crankshaft speed over the period of time; and
- determining from engine crankshaft speed if a frequency order signal corresponding to the periodicity of the step of changing appears.

6. The method of claim 5, further comprising the steps of:
- absent determination of appearance of the frequency order signal corresponding to the periodicity of the step of changing further determining that the injector or injectors under evaluation are not drifting.

7. The method of claim 5, further comprising the steps of:
- upon determination of appearance of the frequency order signal corresponding to the periodicity of the step of changing further determining that one or more of the injector or injectors under evaluation is drifting.

* * * * *